United States Patent
Tran

(10) Patent No.: US 7,938,329 B2
(45) Date of Patent: May 10, 2011

(54) SYSTEM AND METHOD FOR SENSING BIOMETRIC AND NON-BIOMETRIC SMART CARD DEVICES

(75) Inventor: John N. Tran, Austin, TX (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 12/487,010

(22) Filed: Jun. 18, 2009

(65) Prior Publication Data
US 2009/0250523 A1    Oct. 8, 2009

Related U.S. Application Data

(62) Division of application No. 11/391,912, filed on Mar. 29, 2006, now Pat. No. 7,594,603.

(51) Int. Cl.
G06K 7/08 (2006.01)
G06K 19/06 (2006.01)

(52) U.S. Cl. .......... 235/451; 235/492
(58) Field of Classification Search .......... 235/488, 235/492, 380, 451, 382, 379, 487; 382/115–124
See application file for complete search history.

(56) References Cited

U.S. PATENT DOCUMENTS

| | | | | |
|---|---|---|---|---|
| 5,679,945 A * | 10/1997 | Renner et al. | ......... | 235/492 |
| 5,712,472 A * | 1/1998 | Lee | ......... | 235/486 |
| 6,151,647 A | 11/2000 | Sarat | ......... | 710/103 |
| 6,266,725 B1 * | 7/2001 | Deveaud | ......... | 710/105 |
| 6,360,952 B1 * | 3/2002 | Kimlinger et al. | ......... | 235/492 |
| 6,439,464 B1 | 8/2002 | Fruhauf et al. | ......... | 235/492 |
| 6,748,541 B1 | 6/2004 | Margalit et al. | ......... | 713/201 |
| 6,763,399 B2 | 7/2004 | Margalit et al. | ......... | 710/13 |
| 2002/0073340 A1 | 6/2002 | Mambakkam et al. | ......... | 713/202 |
| 2003/0154375 A1 | 8/2003 | Yang | ......... | 713/172 |
| 2004/0129787 A1 | 7/2004 | Saito et al. | ......... | 235/492 |
| 2004/0268133 A1 | 12/2004 | Lee et al. | ......... | 713/186 |
| 2005/0232471 A1 * | 10/2005 | Baer | ......... | 382/115 |
| 2005/0235141 A1 | 10/2005 | Ibrahim et al. | ......... | 713/164 |
| 2006/0016870 A1 | 1/2006 | Bonalle et al. | ......... | 235/380 |
| 2008/0223925 A1 * | 9/2008 | Saito et al. | ......... | 235/380 |

FOREIGN PATENT DOCUMENTS
WO    2005/098737    10/2005

OTHER PUBLICATIONS

Noore, Afzel. "Highly Robust Biometric Smart Card Design." IEEE Transactions on Consumer Electroniccs, vol. 46, No. 4 (Nov. 2000): 1059-1063 <http://ieeexplore.ieee.org/stamp/stamp.jsp?arnumber=00920462>.*

* cited by examiner

Primary Examiner — Michael G Lee
Assistant Examiner — Suezu Ellis
(74) *Attorney, Agent, or Firm* — Lisa K. Jorgenson; Christopher F. Regan

(57) ABSTRACT

A smart card device includes a card body; and a plurality of card contacts carried by the card body. A smart card chip circuit includes a processor carried by the card body and operably connected to the contacts. At least one memory stores a set of instructions relating to initiating and completing smart card transactions between the smart card device and a smart card host. A biometric circuit is carried by the card body and operable with the processor and used for verifying identity of a user for subsequent smart card device usage. Power is received through a first contact for powering a power circuit for the smart card and a biometric subsystem power circuit receives power through a second contact.

4 Claims, 5 Drawing Sheets

SYSTEM AND METHOD FOR SENSING BIOMETRIC AND NON-BIOMETRIC SMART CARD DEVICES

RELATED APPLICATION

This application is a divisional of Ser. No. 11/391,912 filed on Mar. 29, 2006 now U.S. Pat. No. 7,594,603, the disclosure of which is hereby incorporated by reference in its entirety.

FIELD OF THE INVENTION

The present invention relates to the field of smart cards, and more particularly, this invention relates to a system and method for sensing biometric and non-biometric standard smart card devices in a card acceptance device (CAD) operative as a smart card reader.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For examples the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and are a part of everyday usage of a smart card. Eight contacts are located on one side of the card. The smart card performs transactions with a smart card reader using a serial protocol. The mechanical and electrical specifications for a smart card are published by the International Standard Organization (ISO) as ISO7816-X standards, which have allowed the simple and massproduced magnetic stripe cards to evolve toward the smart card. This natural evaluation has allowed smart cards, depending of the IC complexity, of course, to perform prepaid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and Answer to Reset for synchronous cards are incorporated herein by reference.

In operation, smart card readers, i.e., also termed card acceptance devices (CAD's), are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$ and only memories and logic circuits were integrated in the IC. The smart card reader used all eight contacts to interface properly with the different smart card generations. When the smart card was inserted in the payphone, the telephone infrastructure authenticated the smart card and the telephone removed "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer, Secure message, Public Key Infrastructure, Authentication and Electronic Payment are new smart card areas of interest. The smart card acts as an e-commerce facilitator. One advantage of a smart card compared to other solutions is the smart card PIN and cryptographic keys can be stored in its memory and never leave the smart card to be communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$, and the microcontroller and its associated memories and software are integrated in the IC typically with a cryptocontroller. Sometimes, a bio-sensor is integrated, The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D−). The latest version of the USB is currently defined by the Universal Serial Bus Specification Revision 2.0, written and controlled by USB Implementers Forum, Inc., a non-profit corporation founded by the group of companies that developed the USB Specification.

In particular, Chapter 5 USB Data Flow Model, Chapter 7 Electrical, Chapter 8 Protocol Layer and Chapter 9 USB Device Framework of Universal Serial Bus Specification are incorporated herein by reference. The increasingly widespread use of the USB has led smart card reader manufacturers to develop USB interfaces for connection of their products to host computers to complement the existing serial and parallel interfaces.

Although some industries, e.g., banking, have used smart card technology for years, internet users have not taken advantage of smart card technology. Although most internet transactions originate from a PC, and despite some efforts from PC manufacturers, the PC industry has failed to install on each PC a cost effective smart card reader that meets the specific needs of web related applications. To aid this process, "dual mode" smart cards have been developed.

U.S. Pat. No. 6,439,464 to Fruhauf et al., the disclosure which is hereby incorporated by reference in its entirety, discloses a dual mode smart card IC that operates in a first mode, such as an ISO mode in accordance with International Standards Organization 7816 (ISO) protocol, and a USB mode in accordance with the universal serial bus (USB) protocol. This dual-mode IC is implemented as a smart card and includes a microprocessor, switching block, and external interface.

A voltage supply pad, a ground or reference voltage pad, a first set of pads for the first mode, and a second set of pads for the USB mode, form the interface. The first set of pads preferably includes a reset pad, clock pad and an input/output pad in accordance with the ISO 7816 protocol. The second set of pads preferably includes a D+ pad and a D− pad in accordance with the USB protocol. The IC further includes a mode configuration circuit comprising a USB mode detector connected to at least one of the D+ and D− pads. A pull-up resistor preferably connects to one of the D+ and D− pads and a USB voltage detector preferably connects to the voltage supply pad. A latching circuit is connected between the switching block and USB detector, and a control register is connected to the latching circuit for storing a low configuration indicator.

When the dual-mode IC is configured in the USB mode, the first set of pads is disabled based on verification of the USB voltage. When the dual-mode IC is configured in the ISO mode, the second set of pads is disabled after the USB-mode condition is not detected.

The smart cards that are dual mode smart cards as described above and that support ISO 7816 or the USB standard are currently configured in user mode with only one of these communication ports. When the USB port is enabled, the ISO 7816 port is disabled. On the other hand, when the ISO 7816 port is enabled, the USB port is disabled. A primary reason for this functionality is security. It is not desirable to allow potential hackers or software pirates any opportunity to extract from the smart card any information and data regarding the embedded code. In the block and/or lock of the operating mode for the USB or the ISO 7816 mode, the hardware is automatically switched to the corresponding mode after mode detection.

Some smart cards are now using biometric sensors, such as a fingerprint sensor, for security. Most, if not all card acceptance devices, i.e., smart card readers, can only generate a maximum of 50 milliamps, the amount of current used for a typical smart card. With the advent of sensor-on-card technology, however, the electrical current required sometimes peaks at 165 milliamps and, as a result, many problems arise. For example, for the smart card reader to detect the proper voltage on a C1 smart card contact, it cycles through 5 volts, 3 volts and sometimes 1.8 volts until sensing a good Answer to Reset (ATR) from the smart card. This process is accomplished because the chip inside the smart card can have different operating voltages due to silicon technology.

If a smart card reader device detects current in excess of 50 milliamps at the C1 contact, it will shut down. The reader must be able to accept both biometric or sensor-integrated cards and standard smart cards. There are not many known chips for smart card readers that can generate more than 90 milliamps of current at the C1 contact. But, it is still desirable to use existing chips in existing smart card readers. Also, the availability of a high and unsupervised current could potentially damage both the smart card and the reader during improper insertion.

SUMMARY OF THE INVENTION

It is therefore an object of the present invention to provide a system and method that permits a smart card reader to work with both biometric and non-biometric smart cards without substantial circuit charges.

A system of detecting biometric and non-biometric, standard smart card devices includes a smart card host and a smart card device reader operatively connected to the host and adapted to receive one of either a biometric or non-biometric, standard smart card device. The smart card device reader includes a reader circuit that generates power to preselected contacts of a smart card device received therein and communicates therewith. It is operable for receiving an Answer to Reset signal to determine whether the smart card device comprises a biometric or non-biometric, standard smart card device. If a biometric smart card device is detected, the smart card reader is operable for applying power used for standard smart card device operation to a first contact of the smart card device and applying power used by a biometric circuit of the smart card device to a second contact. If a non-biometric, standard smart card device is detected, power is applied only to the first contact.

The smart card device reader can be operable for cycling through power levels on the first contact when a non-biometric, standard smart card device is detected. The smart card device reader can be operable for applying power to a second contact that is unused by the smart card device. It can also be operable for applying power to the first contact to reset the smart card device. The smart card device reader can be operable for receiving a code within the Answer to Reset signal indicating that the smart card device comprises a biometric smart card device.

In another aspect, the smart card device reader can be operable for applying power to a programming voltage (Vpp) contact as the second contact of the smart card device after applying power to a common voltage contact as the first contact. The smart card device reader can also be operable for resetting the smart card device after applying power to the first and second contacts. For example, the smart card device reader is operable for receiving a PTOpen signal for establishing a communication session between the smart card device and smart card device reader.

A smart card device and method are also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

The system and method in accordance with non-limiting examples of the present invention can overcome the problems associated with a card acceptance device (CAD), also commonly referred to as a smart card reader, which previously could not accept both biometric and non-biometric smart cards, also termed smart card devices, because the biometric smart cards required a higher current than a standard CAD or smart card reader could deliver. For purposes of description, the CAD or smart card reader can be any device that accepts a smart card device and "reads" it. The term smart card device reader is also used signifying the reader can "read" different types of smart card devices, including tokens as a subcategory of smart card devices that may work with different standards. In one non-limiting example, an Answer to Reset (ATR) signal is used to determine what voltage the smart card requires. The smart card typically uses a special code in the Answer to Reset that identifies it as a biometric smart card. The smart card reader would read this information and turn on the 3.3 volts on the Vpp pin and perform on ATR again. For non-biometric smart cards, the smart card reader would not turn on at 3.3 volts the Vpp pin and it would follow the standard procedure used for standard, biometric smart card devices.

This low cost solution can use an existing chip of a smart card device reader without requiring new designs. It has a safe power supply for both biometric and non-biometric smart cards and can maintain ISO 7816 compatibility. It can use a USB system. In accordance with a non-limiting example of the present invention, a biometric smart card device, also termed as a sensor-integrated smart card device, can have the power circuit for the smart card device separated from the power that drives the biometric subsystem. The smart card chip power grid can be connected to a C1 contact as a non-limiting example and would obey the typical smart card power cycling scheme. The biometric subsystem power grid could be at a fixed voltage, such as 3.3 volts or 1.8 volts, and can be connected to the C6 contact that is not being used by smart cards. On the reader side, it is possible to implement extra firmware to analyze the ATR coming from the smart card, and thus, not require a new chip.

Figure 1:
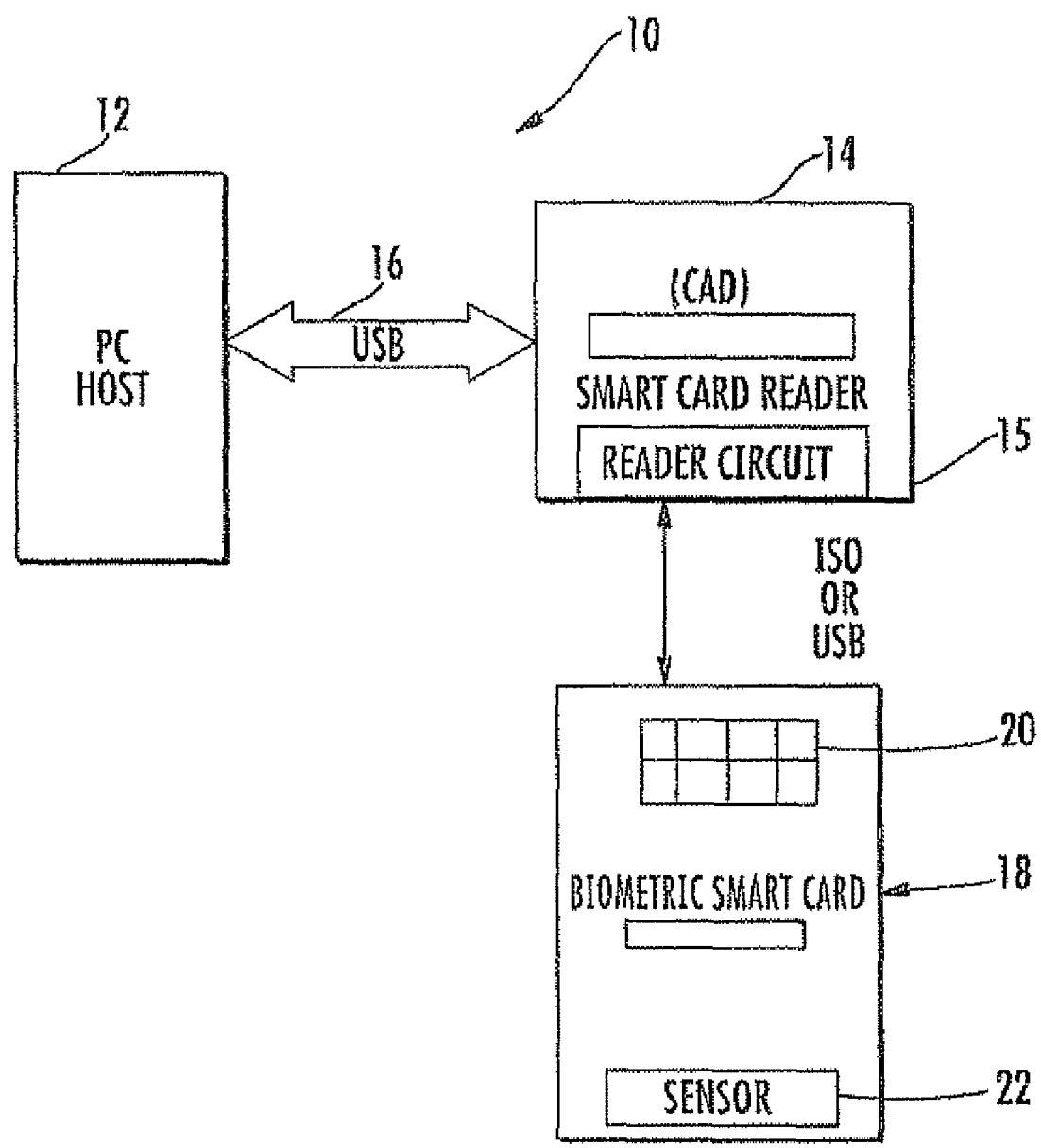
FIG. 1 is a block diagram showing a computer as a PC host, connected to a smart card reader or other card acceptance device that receives a biometric or non-biometric smart card device.

FIG. 1 is a block diagram showing the basic smart card system at 10 and showing a PC host 12, such as a small personal computer, that has a smart card reader or CAD 14 connected thereto, It can attach by USB 16 as illustrated or similar communication system. The smart card reader 14 includes a smart card reader circuit 15 with appropriate firmware that can be updated, The smart card reader 14 would accept a smart card 18, shown as a biometric smart card in the example of FIG. 1, and can communicate by ISO or USB with the smart card. The biometric smart card 18 in this example includes eight contacts as illustrated generally at 20 (FIG. 4) and a biometric circuit indicated generally at 22. The circuit is operable as a sensor. The contacts could be established in different orders, but typically are configured along a standard configuration.

Any type of PC host 12 can be used in this non-limiting example as suggested by those skilled in the art. The smart card reader 14, in one non-limiting example, uses a single-chip solution for EMV-certified card readers and an 8-bit application specific device, for example, a chip from an ST7 family of microcontrollers that typically are flash microcontrollers and manufactured by the assignee, STMicroelectronics, Inc. Different programming methods can be used including an extended flash memory based on EEPROM technology or high density (HD) flash based on flash technology or CFlash as flash memory based on EEPROM technology. The chip can implement the portability of a smart card and allows a secure digital signature and biometric signature. A TouchChip™ biometric subsystem manufactured by the assignee, STMicroelectronics, Inc. can be incorporated and can capture and match fingerprint templates in less than one second. A complementary protector suite OEM software can be used on the PC host and provide various functions, including a secure logon and file encryption. Matching biometric data taken at the PC level with personal ID data stored on the smart card or a token can provide a high level of access control security.

The ST7 chip is typically an S-bit application specific device used in a smart card reader, such as an ST7SCR sold by STMicroelectronics, Inc., and can be aimed at stand-alone USB smart card readers or keyboards with an integrated smart card interface. Typically the ST7SCR peripheral as a smart card reader can include an ISO 7816 UART and power supply management unit to ensure compatibility with smart card voltage, typically at 5 volts, 3 volts and 1.8 volts. Usually, the device features a USB interface and 16K bytes of flash, 512 bytes of RAM, a timer, watchdog and low voltage detector. It is possible to use common criteria ISO 15408 methodology and evaluation EAL4 high as components.

The firmware for the ST7 microcontroller could also be used with an associated smart card reader board available from STMicroelectronics. The ST7 typically incorporates the use of a USB library that manages any USB hardware and a chip card interface device (CCID) implementation that contains high-level functions for using the USB in compliance with CCID specifications such as messages for bulk-in, bulk-out, interrupt and class requests.

An interface device (IFD) implementation can contain high-level functions for ISO 7816 specification implementation and a smart card-specific command interpreter. 7816 UART smart card interface (CRD) management can contain low-level functions for the hardware management of the 7816 UART smart card interface (CRD). A main loop can pull USB transactions using a state machine process, such as a USB polling function from the library for USB low level and endpoint zero management. The CCID part can receive USB bulk-out messages and execute a function corresponding to the bulk-out message as an IFD part. It can send USB interrupt-in messages as the CCID part, if necessary, and send USB bulk-in responses as part of the CCID part. The bulk-out/bulk-in messages can be managed by a state machine. When the bulk-out message reception is completed, the message function can be executed and returned only after the completion of the action to be done in the IFD part. This can take about 10 milliseconds with ATR reading.

The chip card interface device (CCID) firmware implementation conforms to the Universal Serial Bus device specification for USB chip/smart card interface devices. Further details can be found in the AN1527 application note entitled, "Developing a USB Smart Card Reader with ST7 SCR" by STMicroelectronics, the disclosure which is hereby incorporated by reference in its entirety. Other details can be found in the "ST7 Family Flash Programming Quick Reference Manual" by STMicroelectronics, the disclosure which is hereby incorporated by reference in its entirety. Other details regarding a smart card reader ST7 SCR evaluation board for USB can be found in the user guide entitled, "USB Smart Card Reader ST7 SCR Evaluation Board User Guide," by STMicroelectronics, Inc., the disclosure which is hereby incorporated by reference in its entirety.

Figure 2:
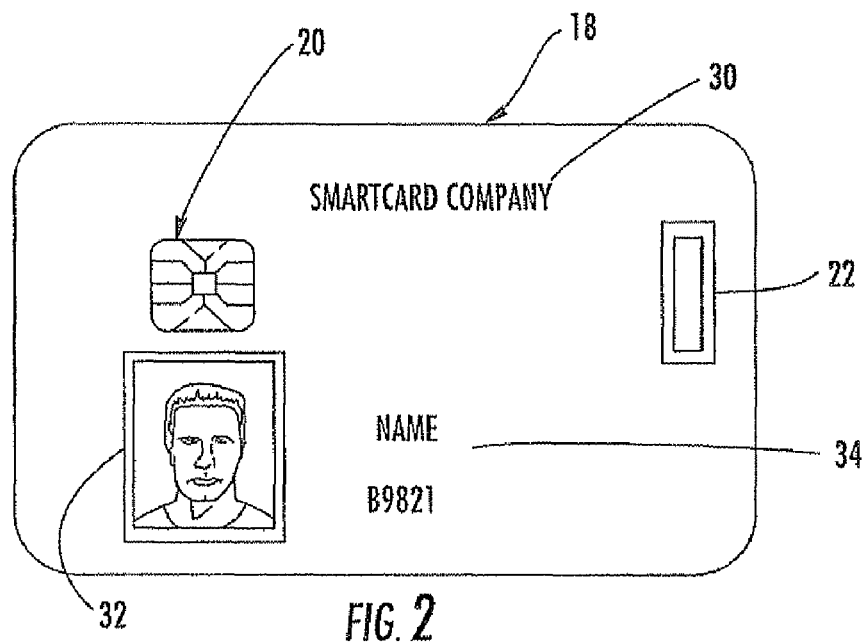
FIG. 2 is a top plan view of an example of a biometric smart card that can be used in one non-limiting example of the present invention.

FIG. 2 shows an example biometric smart card 18 that includes the eight contacts indicated generally at 20 and the name of a company illustrated at 30. The biometric circuit or sensor 22 indicates the position where the finger is placed in this non-limiting example. The actual sensor section could be located different from the electronics in the card, of course. The smart card can include a picture 32 of the holder and the user name or other identifying indicia 34. The smart card 18 can include other indicia or structural functions, of course.

Figure 3:
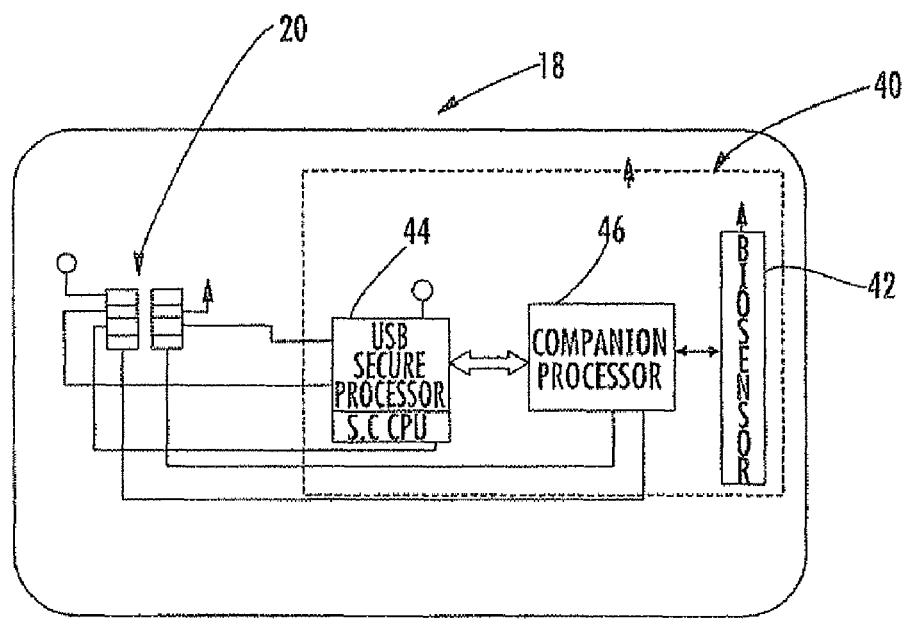
FIG. 3 is a block diagram of a portion of a biometric smart card and showing basic components of the biometric (biosensor) chip and other components and their connection to various smart card contacts in accordance with a non-limiting example of the present invention.
Figure 4:
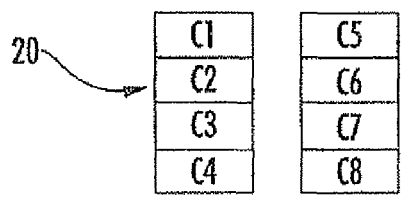
FIG. 4 is a block diagram showing an example of the layout of smart card contacts that can be used with the biometric smart card example shown in FIGS. 2 and 3.

As shown in FIG. 3, the eight contacts 20 are typically labeled C1-C8 as shown in the configuration diagram of FIG. 4. In the high-level component diagram of FIG. 3, the smart card 18 includes an overall circuit 40 that can be implemented as a chip set. This circuit or chip set 40 can include a biometric or biosensor circuit 42 that operates for determining fingerprint identification or other biometric functions. The biometric circuit 42 could be a separate chip or integrated with other functions of the smart card. A USB secure processor 44 can be operative as a smart card CPU and can include various functions, including the circuitry and functions required for dual-mode use. A companion processor 46 is operative with the biosensor (or biometric) circuit 42 and the USB secure processor and can act as an interface. The biometric sensor 42 can also be operative with various cryptography systems as non-limiting examples.

Figure 5:
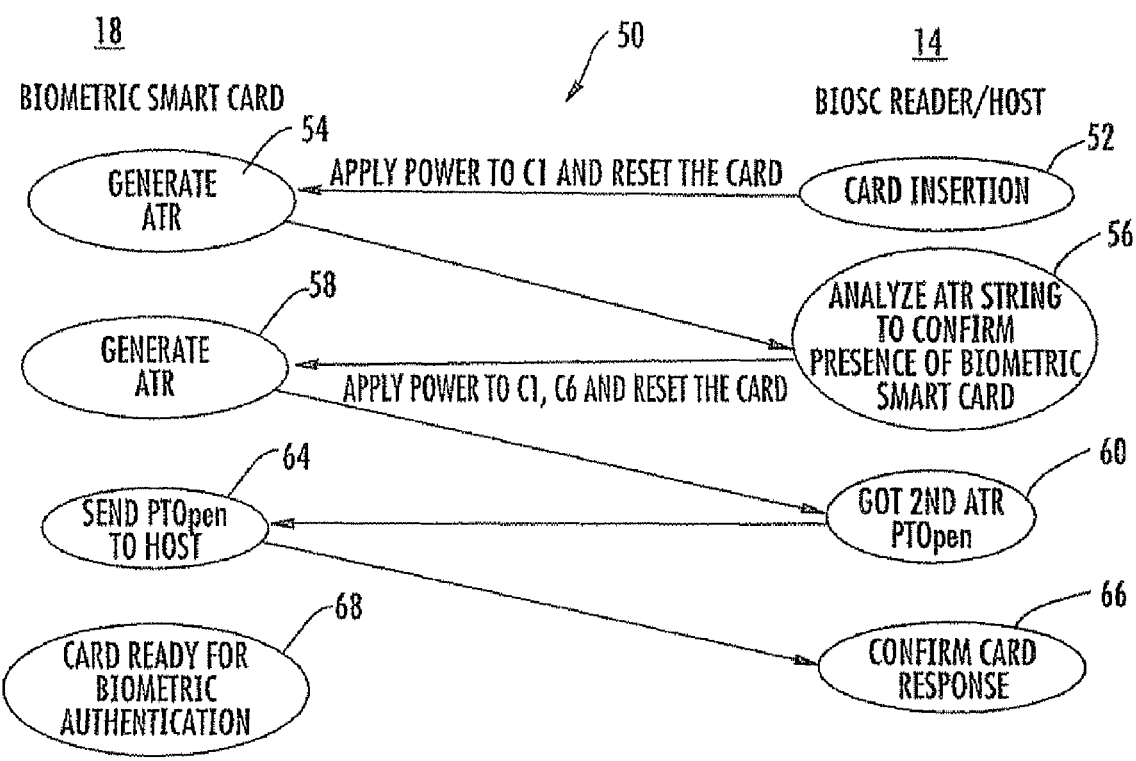
FIG. 5 is a flow diagram showing an example of the sequence of different steps used for determining the presence of a biometric or non-biometric smart card by using an Answer to Reset (ATR) in accordance with a non-limiting example of the present invention.

FIG. 5 shows a sequence diagram 50 of operation between the biometric smart card 18 on the left side and the biometric smart card reader 14 and/or PC host 12 on the right side. When the card is first inserted at the reader 14, power is applied to the C1 contact and the card is reset at step 52. The biometric smart card generates the Answer to Reset (ATR) at step 54. The smart card reader analyzes the ATR string to confirm the presence of the biometric smart card and applies power to C1 and C6 and resets the card at step 56. The biometric smart card generates another ATR to the smart card reader at step 58. At the time of receipt of the second ATR, the command PTOpen occurs at the reader at step 60. The biometric smart card sends the PTOpen command to the host at step 62. The card response is confirmed at step 64. The biometric card is now ready for biometric authentication at step 68.

It is possible for the Answer to Reset (ATR) to have two types of transmission as defined in ISO 8613-3, for example, as an asynchronous and synchronous transmission. In a non-limiting example, characters can be transmitted on the input/output line in an asynchronous half duplex mode for the ATR. Usually the bit duration is defined as an elementary time unit (ETU). There is usually a start bit used for character frame synchronization, eight data bits of information and a parity bit.

It should be understood that smart cards can give an ATR on power-up of the smart card reader upon smart card insertion. This reset could also be accomplished through a specific command to a smart card reader. The ATR from a 7816-compliant smart card can include a TS as an initial character, allowing the smart card and smart card reader to synchronize. A TO is typical as a format character indicating what bytes follow for interface characters and for historical characters. A TA, TB, TC and TD could be optional interface characters. Fine tuning of the interface options can be accomplished through a protocol type selection (PTS) negotiation.

Figure 6:
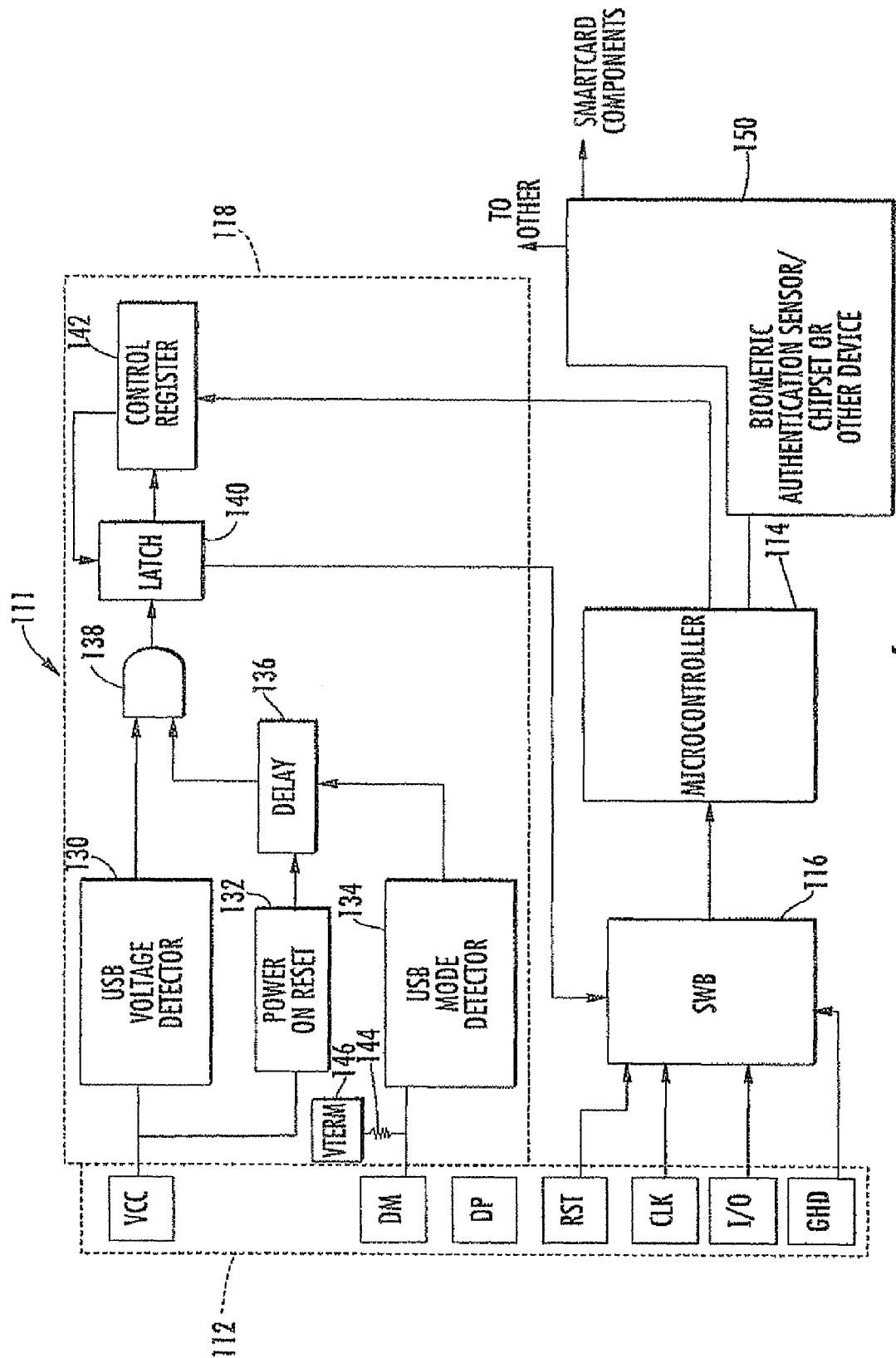
FIG. 6 is a block diagram of a dual-mode integrated circuit that could be modified for use in accordance with the present invention and showing a biometric authentication chip set used with the dual-mode integrated circuit.

An example of a dual mode smart card that can be modified for use in accordance with one non-limiting example of the present invention is shown in FIG. 6. It should be understood that the circuit shown in FIG. 6 is only one of many examples of biometric smart card designs that could be used.

Further details can be found in the incorporated by reference '464 patent.

Referring generally again to FIG. 1, it is evident that a personal computer (PC) 12 as a PC host in this non-limiting example typically includes a central processing unit (CPU) and various input/output devices such as a monitor, keyboard and a mouse. Additionally, the PC 12 has incorporated therewith in some fashion the smart card reader 14 which may, for example, be used to control access to the PC. As shown, the smart card reader 14 can be a separate peripheral device; however, the smart card reader could also be incorporated into the CPU housing or the keyboard, for example.

The smart card reader 14 may conform to the ISO 7816 protocol or a non-ISO protocol such as the Universal Serial Bus (USB) protocol as discussed above. The ISO 7816 protocol is the conventional standard for use in smart cards and includes a voltage supply pad VCC, a ground pad GND, an input/output pad I/O, a reset pad RST and a clock pad CLK. The ISO protocol is characterized by an Answer to Reset (ATR) sequence when a power-on-reset or hardware reset is applied to the IC 111.

The USB protocol is currently being used to replace the different PC 12 interfaces for peripheral devices such as the mouse, keyboard, serial I/O port etc. The USB protocol can be hot plug and play, which means that a USB protocol device can be connected or disconnected from the PC 12 without necessitating a reboot. The USB cable includes a voltage supply wire VBUS, a ground wire GND, a D-plus wire DP and a D-minus wire DM. The signal on DP and DM is a data stream in NRZI coding and includes the clock. The older USB specification requires the power supply of a USB device to be between 4.01V and 5.5V.

It should be understood that the biometric circuit can include many different types of biometric systems. The illustrated fingerprint sensor (or scanner) is a preferred designed in this non-limiting, example. It is possible to use many different types of biometric circuits that can sense or scan physical characteristics for example, the face, fingerprints, irises or veins. Alternatively, the biometric circuits can sense or scan behavioral characteristics, including voice, handwriting or typing rhythm depending on the size of the housing used with the mass storage device and whether it can support a sensor pad or circuit. For example, it is possible not only to analyze a letter in a handwriting detection system, but it is also possible to analyze the act of writing, such as pressure, speed and rhythm with which one writes an initial or name on a sensor pad. Accuracy can be determined by a False Except Rate (FAR), False Reject Rate (FRR), Failure To Enroll Rate (FTE) and Failure To Acquire Rate (PTA). It is possible to use some systems that have a voice print recognition system, such that wave patterns can be memorized and sound spectrograms used for identity detection. Voice print recognitions could also be used. It is also possible to use layered systems that combine biometrics with a keycard or Persona Identification Number (PIN) and systems that combine multiple biometric methods, including an iris scanner, a voice print system or fingerprint sensor. Iris scanning is possible and is typically not the same as retinal scans in which a picture of the blood vessel structure in the back of the eye is scanned. It is possible to use vein geometry in which a camera takes a digital picture of a vein structure in for example, a hand, using near-infrared light.

The fingerprint sensor or scanner could obtain an image of a finger and determine whether any pattern of ridges and valleys in the image matches the pattern of ridges and valleys in a prescan image. Optical scanning and capacitance scanning could be used. The optical scanners would typically include a Charge Coupled Device (CCD) with its own light source and an array of light embedding diodes. Capacitance scanners use a tiny array of cells that include conductor plates covered with insulating layers or other similar systems in some non-limiting examples. Feed back loops could be used in such systems. It is also possible to use RF signals to detect a fingerprint ridge and valley pattern, where a fingerprint pattern can be read from the conductive layer of skin beneath the dry outer surface skin layer. Pixel sensor plates could be operative with an excitation signal reference plane in a semiconductor substrate having sense amplifiers that are output.

As set forth previously, a smart card system can operate in the ISO 7816 protocol and another non-ISO protocol, such as the USB protocol, depending on the type of reader the card is communicating with in different non-limiting examples. Thus, referring to FIG. 6, a dual-mode IC 111 is capable of operating in a first mode such as an ISO mode in accordance with International Standards Organization 7816 (ISO 7816) protocol, and a second non-ISO mode such as a USB mode in accordance with Universal Serial Bus (USB) protocol. The dual-mode IC 111 operates selectively in one mode or the other, but not both simultaneously.

The dual-mode IC 111 is preferably in the smart card 18 and includes a microprocessor 114, a switching block 116, and an external interface 112. The external interface 112 comprises a voltage supply pad VCC, a reference voltage/ground pad GND, a first set of pads for the ISO mode, and a second set of pads for the non-ISO mode. The first set of pads preferably include a reset pad RST, a clock pad CLK and an input/output I/O pad in accordance with the ISO 7816 protocol. The second set of pads preferably includes a D-plus pad DP and a D-minus pad DM in accordance with the USB protocol.

Because the IC 111 can only operate in one of the two modes which have different external interfaces, the IC will need to determine in which mode to operate. Thus, the IC 111 includes a mode configuration circuit 118 comprising a USB mode detector 134 connected to at least the D-minus pad. The USB mode detector may also be connected to the D-plus DP pad as shown in FIG. 6. The mode configuration circuit 118 may also include a USB voltage detector 130 connected to the voltage supply pad VCC for detecting a USB mode voltage supply, a latching circuit 140 connected to the switching block and receiving outputs from the USB mode detector 134 and the USB voltage detector 130, and a control register 142 connected to the latching circuit 140 for storing a mode configuration indicator.

A delay block 136 may be connected between the USB mode detector 134 and the latching circuit 140, while a power-on-reset circuit may be connected between the voltage supply pad VCC and the buffer. The delay block 136 delays the detection by the USB mode detector 134 until a predetermined time, e.g. 1-10 ms, after first contact to avoid a false detection due to rebound. Also, a logic gate/circuit 138 may be connected between the latching circuit 140 and the detectors 130, 134. Furthermore, the USB 1.1 protocol requires a 1.5 KOhm resistor 144 connected between the D-minus pad DM and about 3.6V or VTERM from a voltage regulator to aid in the identification of a low-speed USB device, as would be appreciated by the skilled artisan.

During the start-up or power-on sequence of the IC 111, the mode configuration circuit 118 configures the IC 111 to operate in one of the ISO and USB modes while disabling the other mode. For example, the reset pad RST, clock pad CLK and input/output I/O pad are disabled when the IC 111 is configured in the USB mode, and the D-plus pad DP and D-minus DM pad are disabled when the IC 111 is configured in the ISO mode. To prevent any glitches, the detected mode is latched by the latching circuit 140 while the appropriate bit is set in the control register 142. Because the mode detection is a hardware detection, the operating system of the IC 111 will then check this bit during the reset routine to access the appropriate code for the latched mode.

Accordingly, if the smart card 110 including the dual mode IC 111 is used with a typical smart card reader, it will operate as specified in the ISO 7816 protocol while the USB interface, i.e. the D-plus DP and D-minus DM pads, is disabled to consume less power, However, because the IC 111 includes a USB interface, ISO 7816-like transactions can be performed using a low-cost USB device rather than an ISO-compliant smart card reader. Here, the ISO mode interface, i.e. the reset RST, clock CLK and input/output I/O pads, is disabled. Once the IC 11 is configured in one of the modes, it must stay in that mode until another power-on-reset.

For security and integrity of the dual-mode IC 111, the mode should be detected as soon as possible because once the IC is configured in a mode, it will not typically be changed until another power-on-reset is executed. In this embodiment, the IC 111 is configurable in the ISO mode by default. In other words, if the USB mode is not detected, then the mode configuration circuit 118 configures the IC 111 in the ISO mode and disables the USB mode and interface. To operate in the USB mode, the presence of a USB bus typically is detected before an ATR of ISO 7816 occurs. In the USB protocol, a low-speed USB device is detected with a pull-up resistor, such as resistor 144, on DM. A downstream transceiver of a USB hub has a pull-down resistor connectable to the D-plus DP and D-minus pads DM. So, when the IC 111 is connected to a USB hub, a current would be sensed by the USB device and the IC 111 would be recognized as being low-speed on DM and/or high-speed on DP.

When the IC 111 is powered by the USB device when it is attached, the power-on-reset signal could reset the IC 111 when it reaches 2.3V. This signal could stay at "1" until a DC/DC voltage regulator of the IC 111 is stable, e.g. for about 300 µs. When the power-on-reset signal falls to "0", the IC 111 supply is typically greater than 2.3V and the DC/DC is stable. The USB mode detector should be powered by the same voltage regulator as the IC 111 to be active as soon as possible. In this example, at power-on, the pull up resistor 144 on D-minus DM is not active until the voltage regulator (VTERM) is turned on by the IC 111. The microprocessor 114 reads the control register 142 for the indication of the mode in which to operate. For the USB mode, the microprocessor 114 starts the voltage regulator of the USB protocol. In this condition, the two pull down resistors of the USB hub which are now connected to the D-plus DP and D-minus DM pads, create a "0" state on the bus of the USB device. The trailing edge of the power-on-reset signal can create a pulse of 1 ms via delay block 136 during which the mode configuration circuit will detect the USB mode. However, this time can be increased, e.g. to 10 ms, if it is necessary to ensure that it works accurately during a slow insertion of the medium, e.g. the smart card 110, in the USB reader.

Thus, preferably, the USB mode detector 134 detects the "0" state on the D-plus and D-minus pads when the power-on-reset signal falls to "0". If so, then the USB voltage detector 130 detects whether a power supply on the voltage supply pad VCC is greater than about 3.5 volts or preferably between about 4.01 and 5.5 volts to verify that the medium with the dual-mode IC 111 is communicating with a USB device.

Typically for IS mode, the mode configuration circuit 118 sets the switching block 116 in IS mode which starts the IC 111 in the IS mode. The USB pads DP, DM and the mode configuration circuit 118 may then be disabled. For the USB mode, the mode configuration circuit 118 sets the switching block 116 in USB mode which starts the IC 111 in the USB mode. The microprocessor 114 verifies that there is a USB cable attached and then enables the voltage regulator providing VTERM to the DM pad via resistor 144. The mode configuration circuit 118 and the IS pads may then be disabled.

A system using such an IC 111 could include an ISO-compliant reader and a USB-compliant reader, but would have to be compliant to read the biometric smart card 18. The ISO-protocol reader may be a smart card reader that would provide the necessary signals at the appropriate pads of the external interface 112 of the IC 111 as would be appreciated by the skilled artisan. Thus, when a smart card 110 including the dual mode IC 111 is inserted into a smart card reader, the mode configuration circuit 118 configures the IC 111 in the ISO mode because the USB-mode condition is not detected on the D-plus and D-minus pads. However, a USB-compliant reader would create the USB-mode condition on the D-plus and D-minus pads. So, when the smart card 110, or other medium, is connected to such a USB-compliant reader, the mode configuration circuit 18 configures the IC 111 in the USB mode because the USB-mode condition is detected.

The biometric authentication chip set is illustrated generally at 150 and is operative with the different circuits of the smart card. This chip 150 is illustrated as a separate circuit, but could be incorporated with functions as described before. The chip 150 could include a sensor and other smart card components that are operable with IC 111. It should be understood that the biosensor 42 shown in FIG. 3 could be operative with the microcontroller 114 or another processor such as the companion processor 46 or as part of the circuit 150. Many different designs could be used for the biometric sensor chip set.

Figure 7:
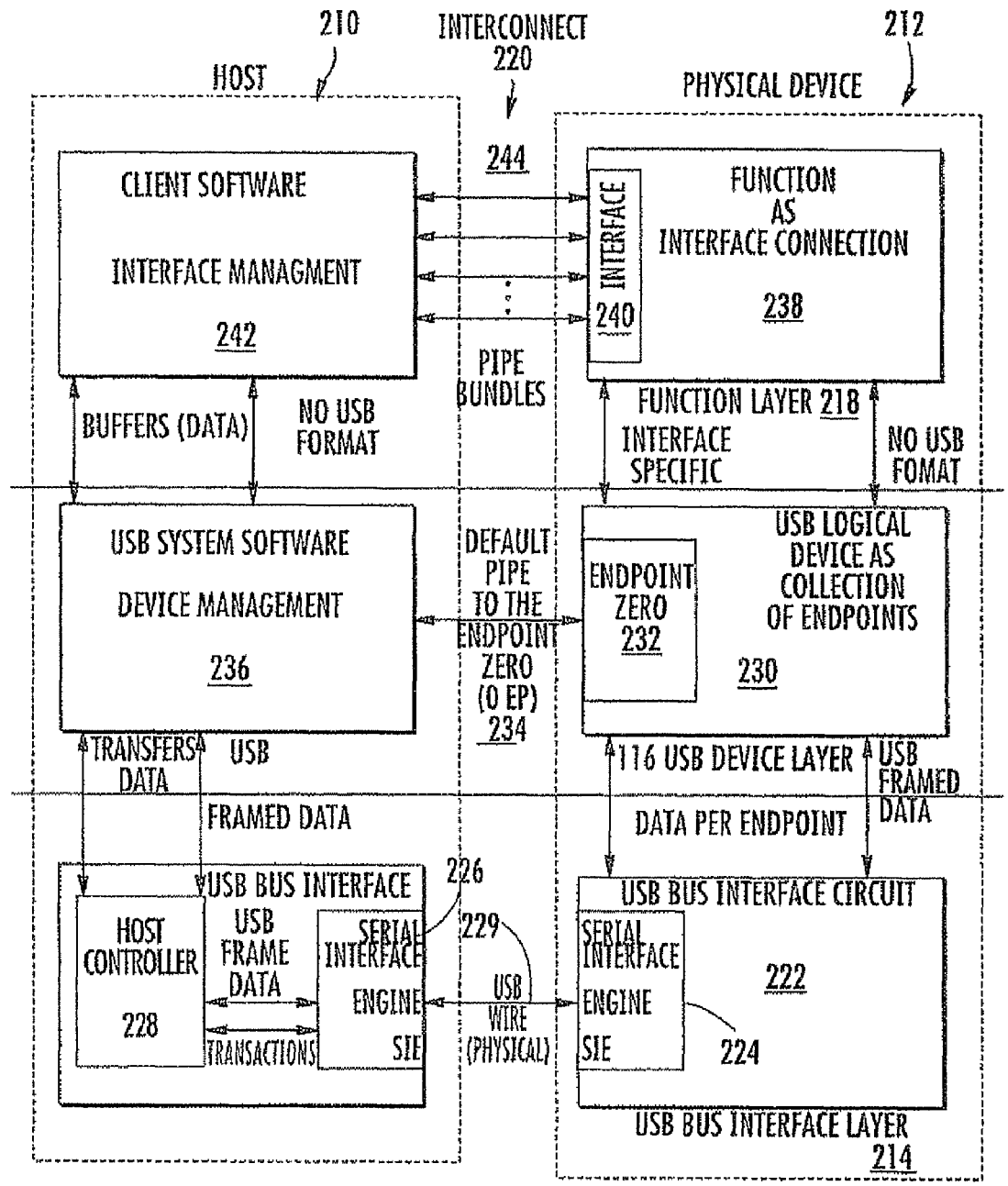
FIG. 7 is a block diagram of a USB showing the different data transport mechanisms, pipes and a USB-relevant format of transported data between the host and interconnective physical device as taught in the Universal Serial Bus Specification Revision 2.0.

FIG. 7 shows a basic USB data flow between a USB host and a USB device and the various implementations and layers in accordance with the universal serial bus specification 2.0 and shown in FIG. 7 in detail as a non-limiting example of a sequence flow that could be possible. It should be understood that the flow shown in FIG. 7 is only an example and not limiting.

As shown in FIG. 7, the connection of a host 210 to a physical device 212 requires the interaction between different layers, i.e., the USB bus interface layer 214, USB device layer 216, and function layer 218. An interconnect 220 between the host and device is illustrated.

The USB bus interface layer 214 includes a USB bus interface circuit 222 and serial interface engine (SIE) 224 at the device 212 that communicates with a serial interface engine (SIE) 226 and its host controller 228 at the host 210 via a physical wire 229. The USB device layer 216 includes at the physical device 212 a collection of endpoints as a USB logical device 230. An endpoint zero 232 is operable in communication via the default pipe 234 to USB system software 236 that is operable for device management at the host 210. The function layer 218 includes at the physical device 212, a logical function 238 as an interface collection, and the interface 240 that communicates via a plurality of pipe bundles 244 to client software 242 that is operable for interface management.

The USB bus interface layer 214 provides the physical wire 229 for the traffic signaling and packet conductivity between the host 210 and physical device 212. The USB device layer 216 views the USB system software 236 to perform generic USB operations with the physical device 212 via the default pipe 234 to endpoint zero 232. The functional layer 218 adds capabilities to the host using matched client software. The USB Device Layer 216 and Function Layer 218 each view logical communications within their layers and use the USB Bus Interface Layer 214 for any data transfer. The USB host 210 coordinates the overall USB system, controls access, and monitors the USB topology.

Logical communications exist between the client software and the Function Layer 218 and the USB system software 236 and USB logical device 230, Actual packets flow between the USB host controller 228 and the USB bus interface circuit 222.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 278 and USB system software 276 implements the host controller driver and allows the host controller to implement functions without requiring the host software to be dependent on any particular implementation. One USB driver can support different host controllers. Specific knowledge of a host controller implementation is not required.

The USB logical device 230 can be considered a collection of endpoints and are grouped into endpoint sets to implement the interface. The USB system software 236 manages or controls the device using the default pipe 234 to the endpoint zero 232. Client software 242 manages the interface using pipe bundles 244 associated with an endpoint set. Data is moved between a buffer on the host 210 and an endpoint on the USB device 212 when client software requests the data. The host controller 228 or USB device 212, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 234.

The data transport mechanism includes transfers of data between the host controller 228 and the USB system software 236 at the host 210. Buffers can be used as a data transport mechanism between the USB system software 236 and the client software 242 at the host 210. The other data transport mechanism includes transactions between the host controller 228 and the serial interface engine 226 within the USB bus interface of the host.

The data transport mechanism also exists as a data per endpoint between the USB bus interface circuit 222 and the USB logical device 230 at the physical device 212. The data transport mechanism between the function 238 (and with the interface 240) and the endpoint zero 232 is interface-specific.

USB-relevant format of transported data occurs as USB frame data between the serial interface engine 226 and the host controller 228 and between the host controller 228 and the USB system software 236 at the host 210. No USB format for transporting data exists between the client software 242 that manages an interface and the USB system software 236.

At the device 212, USB-relevant format of transported data exists as USB frame data between the USB bus interface circuit 222 and the USB logical device 230. No USB format of data occurs between the interface 240 and the endpoint zero 232 at the device 212.

Further details of the functioning of the USB host and device and data flow can be found in the Universal Serial Bus Specification Revision 2.0, including Chapter 5 entitled "USB Dataflow Model," the disclosure for the entire Specification Revision 2.0 which is hereby incorporated by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A smart card device, comprising:
a card body;
a plurality of card contacts carried by the card body and adapted to be connected to a smart card reader when the card body is received within a smart card reader;
a smart card integrated circuit comprising a processor carried by said card body and operably connected to said contacts and comprising at least one memory for storing a set of instructions relating to initiating and completing smart card transactions between the smart card device and a smart card host and further comprising a power circuit connected to a first contact and configured to draw power therefrom; and
a biometric circuit carried by the card body and operable with said processor and used for verifying identity of a user for subsequent smart card device usage, and further comprising a biometric subsystem power circuit connected to a second contact and power is received through said second contact without drawing power from the first contact, wherein said smart card integrated circuit is configured to transmit an Answer to Reset signal that is used to determine a voltage required to power the biometric circuit.

2. A smart card device according to claim 1, wherein said first contact comprises a common voltage contact and said second contact comprises a programming voltage (Vpp) contact.

3. A smart card device according to claim 1, wherein said Answer to Reset signal includes a code indicating that the smart card device comprises a biometric smart card.

4. A smart card device according to claim 1, wherein said biometric circuit comprises one of a capacitance, optical and RF (radio frequency) scanner circuit.

* * * * *